(12) United States Patent
McGory

(10) Patent No.: US 11,661,113 B2
(45) Date of Patent: May 30, 2023

(54) VEHICLE AERODYNAMIC COVER

(71) Applicant: NISSAN NORTH AMERICA, INC., Franklin, TN (US)

(72) Inventor: Michael McGory, West Bloomfield, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 163 days.

(21) Appl. No.: 17/187,600

(22) Filed: Feb. 26, 2021

(65) Prior Publication Data

US 2022/0274654 A1    Sep. 1, 2022

(51) Int. Cl.
*B62D 25/18* (2006.01)
*B62D 25/16* (2006.01)
*B60R 13/08* (2006.01)

(52) U.S. Cl.
CPC .......... *B62D 25/18* (2013.01); *B60R 13/0861* (2013.01); *B62D 25/163* (2013.01)

(58) Field of Classification Search
CPC .... B62D 25/18; B62D 25/163; B60R 13/0861
See application file for complete search history.

(56) References Cited

U.S. PATENT DOCUMENTS

| | | |
|---|---|---|
| 6,007,144 A | 12/1999 | Uloth |
| 6,155,624 A | 12/2000 | Bienenstein, Jr. |
| 8,820,822 B2 | 9/2014 | Witkop et al. |
| 8,973,981 B2 | 3/2015 | Vaughn, Jr. |
| 9,428,121 B2 | 8/2016 | Vaughn, Jr. |
| D883,157 S | 5/2020 | McMath |
| 10,882,564 B2 | 1/2021 | Dennis |

FOREIGN PATENT DOCUMENTS

EP    3260359 A1 * 12/2017 ........... B62D 35/001

* cited by examiner

*Primary Examiner* — Dennis H Pedder
*Assistant Examiner* — Melissa Ann Bonifazi
(74) *Attorney, Agent, or Firm* — Global IP Counselors, LLP

(57) ABSTRACT

A vehicle aerodynamic cover includes an upper body portion, a lower body portion and a boundary. The upper body portion defines a top edge. The lower body portion extends downwardly from the upper body portion and defines a bottom edge. The upper body portion is inclined in an inboard direction relative to the lower body portion when the aerodynamic cover is in an installed state. The boundary connects the upper and lower body portions.

18 Claims, 10 Drawing Sheets

VEHICLE AERODYNAMIC COVER

BACKGROUND

Field of the Invention

The present invention generally relates to a vehicle aerodynamic cover. More specifically, the present invention relates to a vehicle aerodynamic cover for a wheel well area of the a vehicle.

Background Information

A wheel well is the space in a vehicle's structure where the vehicle's tire is positioned. Pickup trucks can be structured so that the vehicle body is raised in comparison to conventional vehicles. Therefore, the wheel well area of pickup trucks can be larger in comparison to conventional vehicles.

SUMMARY

In view of the state of the known technology, one aspect of the present disclosure is to provided a vehicle aerodynamic cover comprises an upper body portion, a lower body portion and a boundary. The upper body portion defines a top edge. The lower body portion extends downwardly from the upper body portion and defines a bottom edge. The upper body portion is inclined in an inboard direction relative to the lower body portion when the aerodynamic cover is in an installed state. The boundary connects the upper and lower body portions.

Also other objects, features, aspects and advantages of the disclosed vehicle aerodynamic cover will become apparent to those skilled in the art from the following detailed description, which, taken in conjunction with the annexed drawings, discloses one embodiment of the vehicle aerodynamic cover.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
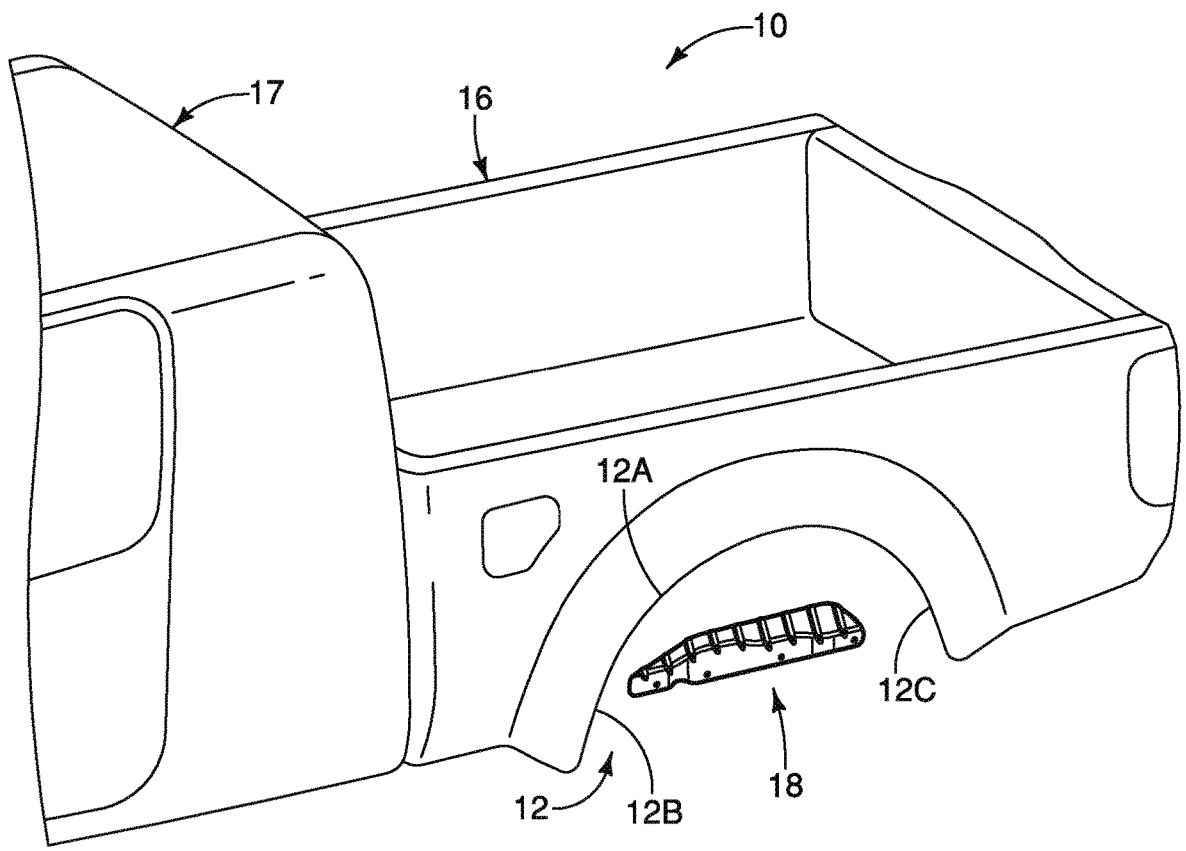
FIG. 1 is a perspective view of a portion of a vehicle body of a vehicle and an aerodynamic cover for the vehicle.
Figure 2:
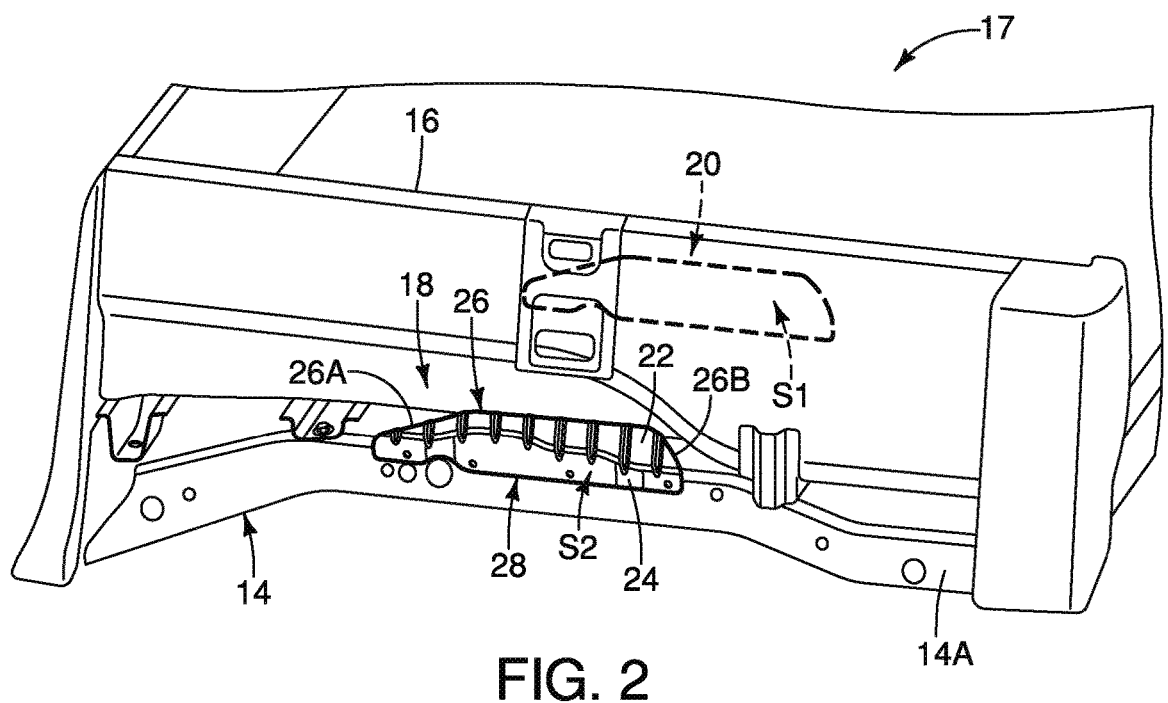
FIG. 2 is a perspective view of a portion of a truck bed and a chassis of the vehicle having the aerodynamic cover installed thereon.
Figure 3:
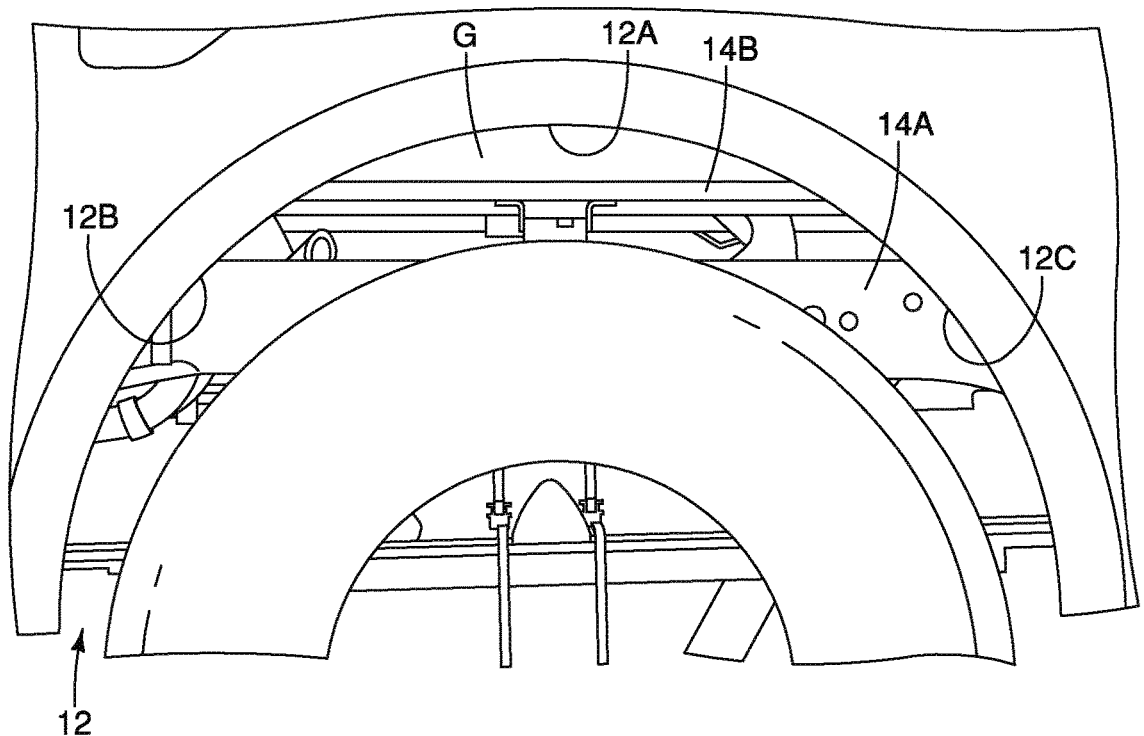
FIG. 3 is an elevational view of a wheel well area of the vehicle without the aerodynamic cover.
Figure 4:
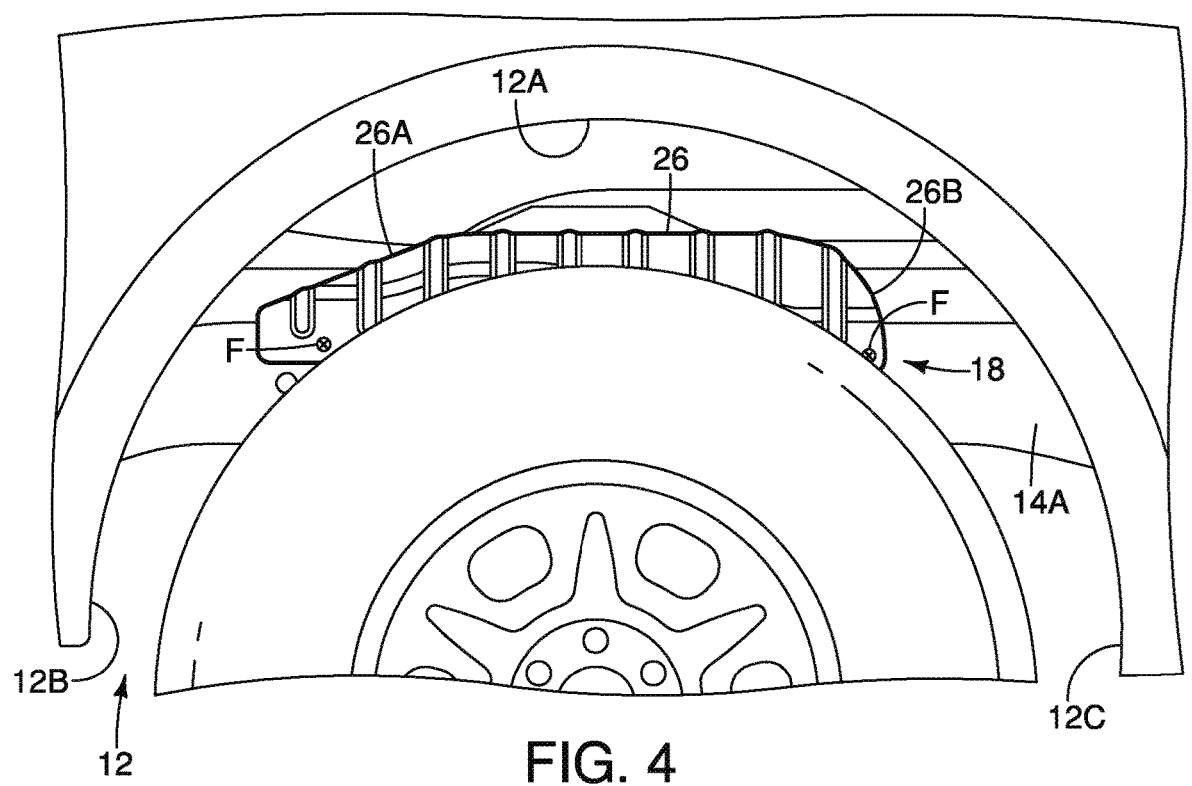
FIG. 4 is an elevational view of the wheel well area of the vehicle with the aerodynamic cover installed thereon.

Referring initially to FIGS. 1 and 2, a portion of a vehicle 10 is illustrated. The vehicle 10 of the illustrated embodiment is preferably a pickup truck having a wheel well 12 that accommodates a vehicle tire, as shown in FIG. 3. As seen in FIGS. 2 to 9, a vehicle wheel well 12 area is illustrated, showing a chassis 14 and a portion of a truck bed 16 of the vehicle 10. Therefore, the vehicle 10 comprises the chassis 14 and the truck bed 16.

As seen in FIG. 1, the chassis 14 has a pair of frame rails 14A and 14B that supports the truck bed 16 thereon. The frame rails 14A and 14B are preferably made of a highly durable, rigid material such as carbon steel, or aluminum alloys to achieve a more light-weight construction. The frame rails 14A and 14B can be made of steel channel sections, made by folding, rolling, or pressing steel plate(s). As seen in FIGS. 4 to 9, the wheel well 12 is defined by the frame rail 14A and the vehicle body 17 portions of the truck bed 16 that form a top portion 12A of the wheel well 12, a front portion 12B and a rear portion 12C.

The truck bed 16 is part of the vehicle body 17. The truck bed 16 is mounted on the chassis 14, as best seen in FIGS. 2 and 3. The vehicle truck bed 16 of the illustrated embodiment is preferably a high-mounted truck bed 16 that is raised over the chassis 14 to be higher in comparison to conventional vehicles and conventional pickup trucks. Therefore, a posture of the vehicle body 17 has been raised in the illustrated embodiment in comparison to conventional vehicles. The increased height of the vehicle body 17 on the chassis 14 creates a space (shown by a gap G) extending laterally between the frame rails 14A and 14B of the chassis 14 that can be visible from the wheel well 12, as seen in FIG. 3. That is, a space extends laterally between the wheel well 12 and a corresponding wheel well 12 on an opposite side of the vehicle 10. As best seen in FIG. 3, the space is shown between the top portion 12A of the wheel well 12 and the frame rail 14A. A corresponding space exists for the corresponding wheel well 12 of the vehicle's 10. Therefore, the gap G is visible from both sides vehicle 10 such that a person on one side of the vehicle 10 can see through the space G.

Therefore, in the illustrated embodiment, the vehicle 10 is provided with a vehicle aerodynamic cover. That is, the vehicle 10 comprises a pair of first and second aerodynamic covers 18 and 20. The first vehicle aerodynamic cover 18 is supported to the frame rail 14A to cover the gap G formed between the chassis 14 and the truck bed 16, as seen in FIG. 2. The second vehicle aerodynamic cover 20 is supported to the frame rail 14B to cover the gap G. In the illustrated embodiment, the vehicle 10 can include one or both of the first and second aerodynamic covers 18 and 20 to cover the gap G. The first and second aerodynamic covers 18 and 20 are provided to the vehicle 10 to cover the gap G, and additionally for improving aerodynamics of the vehicle 10. In particular, the first and second aerodynamic covers 18 and 20 prevent airflow from traveling laterally between the vehicle 10 between the gaps G of the wheel wells 12.

Further, due to the increased height of the vehicle body 17, there is an overall increase in airflow in the area between the vehicle body 17 and the chassis 14. That is, there is increased airflow traveling between the gaps G of the wheel well areas of the vehicle 10 that prevents airflow traveling from a vehicle front to a vehicle rear from being streamlined. That is, airflow between the vehicle body 17 and the chassis 14 caused by forward traveling of the vehicle 10 is prevented from moving straight from the vehicle's 10 front to the rear due to the increased airflow traveling laterally between the gaps G. Therefore, the first and second aerodynamic covers 18 and 20 are designed to cover the gaps G of the wheel well 12, and to facilitate rearward airflow so that airflow travels in a more streamlined pattern from the vehicle front to the rear direction.

As the first and second aerodynamic covers 18 and 20 are basically identical except for their placement on the vehicle 10, only one of the aerodynamic covers (i.e., the first aerodynamic cover 18) will be further discussed. As seen in FIGS. 6 to 9, the aerodynamic cover 18 inclines inboard when supported to the frame rail 14A. That is, the aerodynamic cover 18 is inclined in a direction toward a center of the vehicle 10 that is away from the vehicle's 10 exterior. In the illustrated embodiment, "inboard" refers to a side or direction facing towards the vehicle's 10 center.

Figure 10:
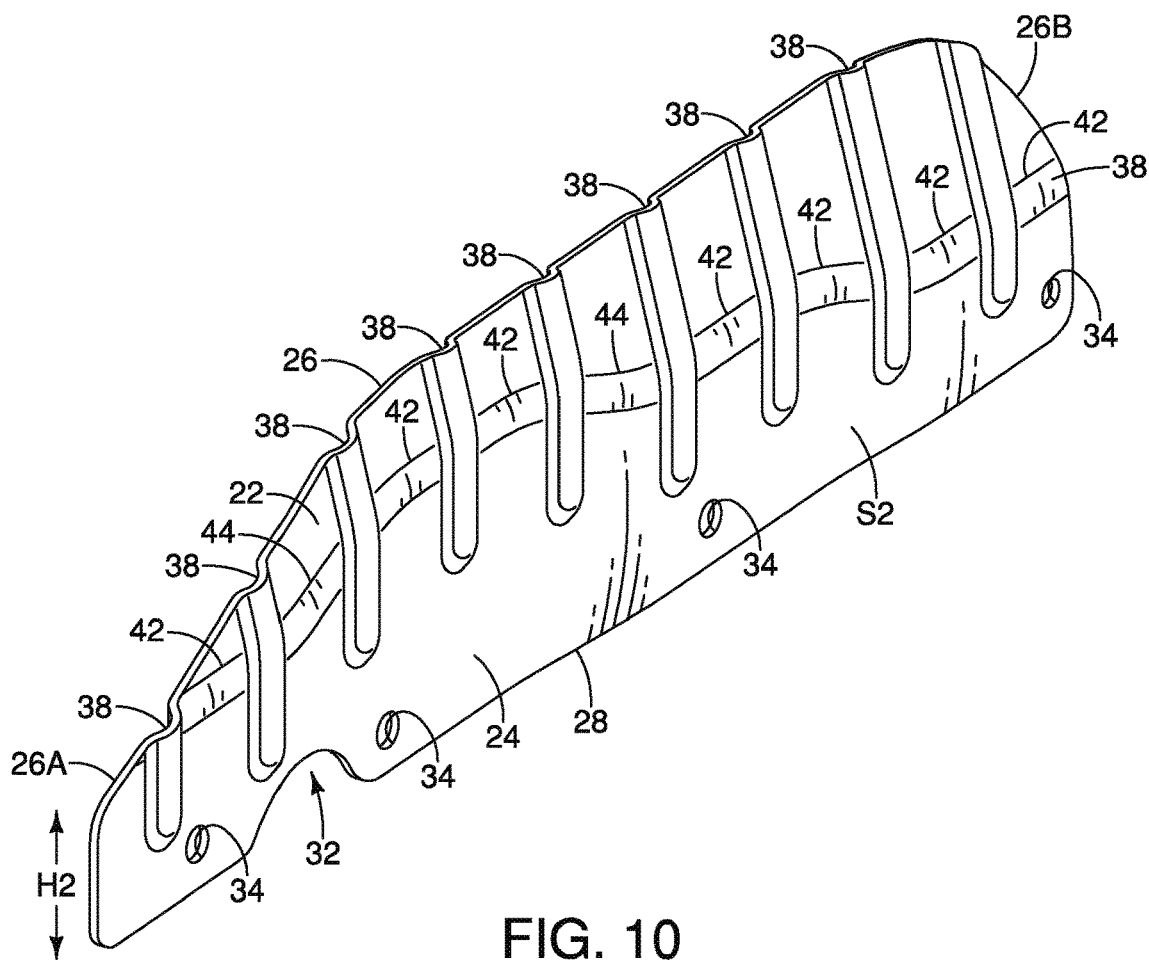
FIG. 10 is a perspective view of the aerodynamic cover as seen from an outboard side of the aerodynamic cover.
Figure 11:
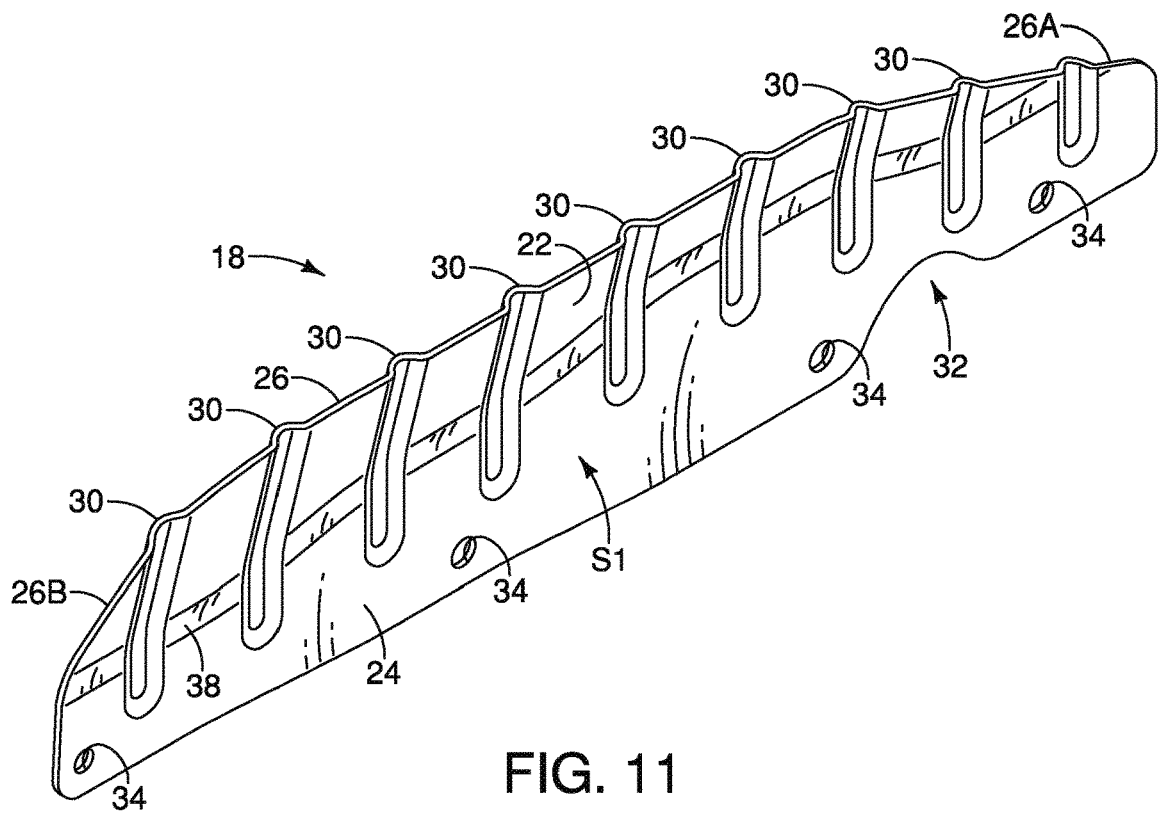
FIG. 11 is a perspective view of the aerodynamic cover as seen from an inboard side of the aerodynamic cover.
Figure 12:
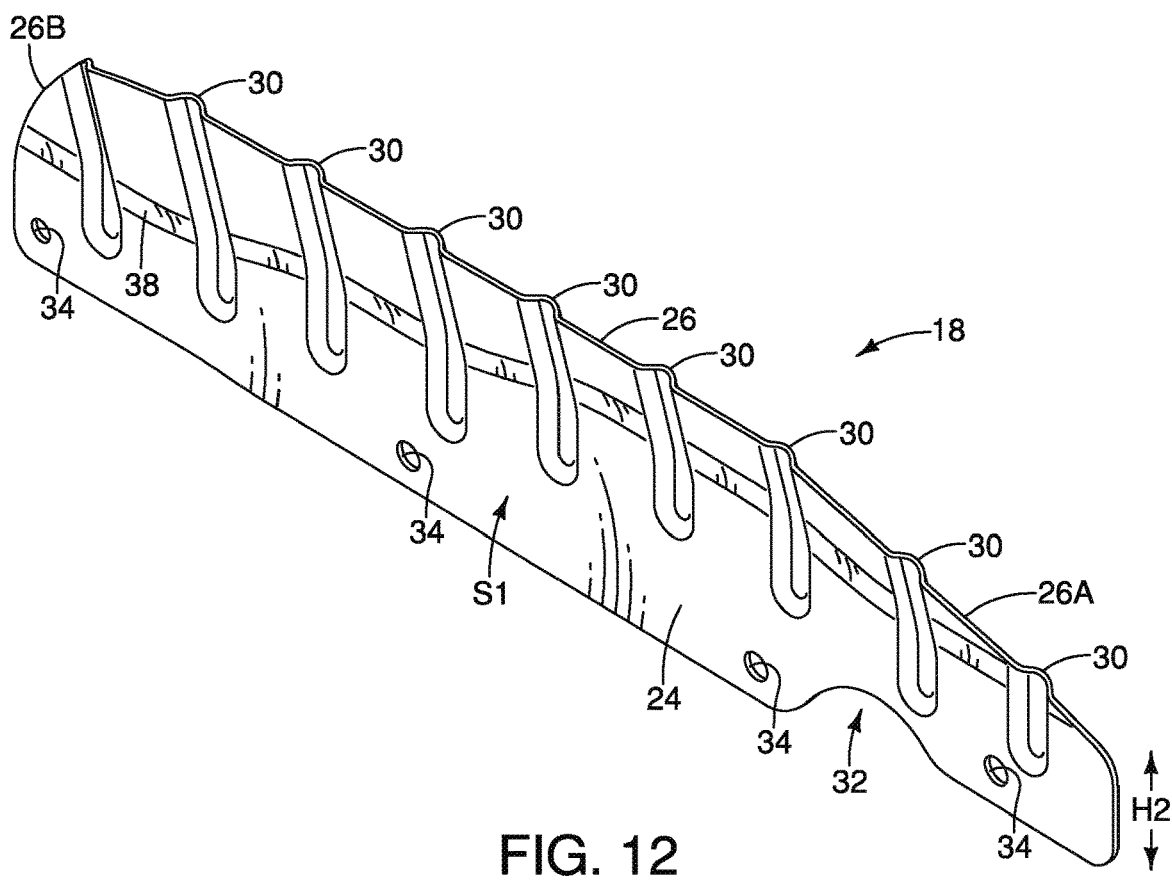
FIG. 12 is another perspective view of the aerodynamic cover as seen from the inboard side of the aerodynamic cover.

Referring to FIGS. 10 to 12, the vehicle aerodynamic cover 18 includes an upper body portion 22 and a lower body portion 24. The upper body portion 22 defines a top edge 26 of the aerodynamic cover 18. The lower body portion 24 extends downwardly from the upper body portion 22 and defines a bottom edge 28 of the aerodynamic cover 18. The lower body portion 24 is configured to be mounted to the vehicle frame rail 14A, as will be further discussed.

Figure 18:
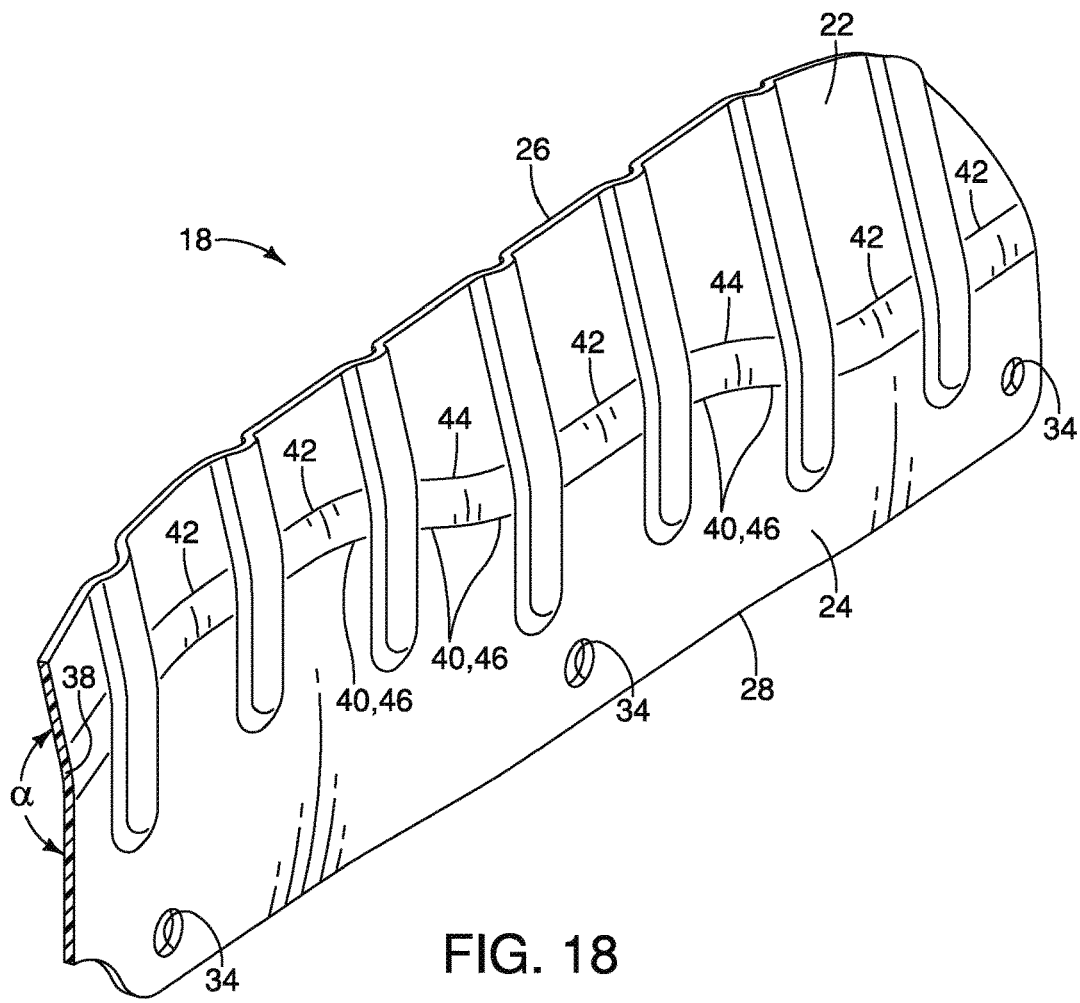
FIG. 18 is a perspective cross-sectional view of a portion of the aerodynamic cover.
Figure 19:
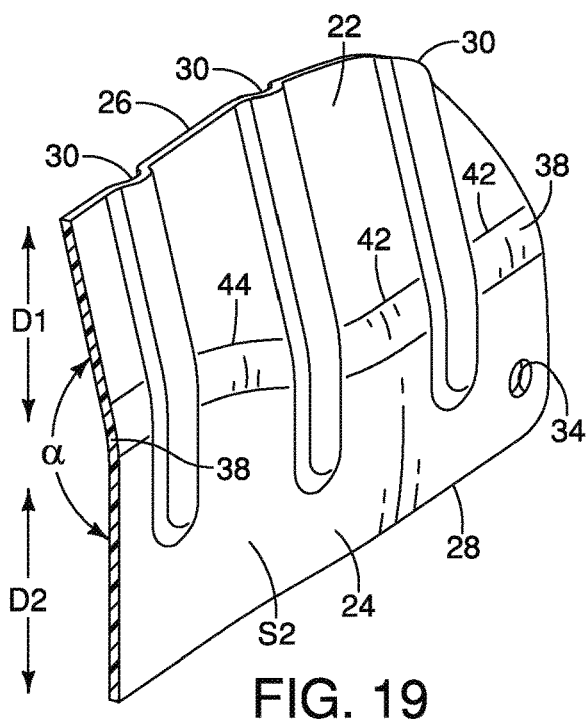
FIG. 19 is another perspective cross-sectional view of a portion of the aerodynamic cover.

The upper body portion 22 is inclined in the inboard direction relative to the lower body portion 24 when the aerodynamic cover 18 is supported to the one of the frame rails 14A and 14B. As shown in FIGS. 18 and 19, the upper body portion 22 is inclined relative to the lower body portion 24 at an angle α. Preferably, the angle α is between 160 and 170 degrees. That is, the upper body portion 22 is inclined relative to the lower body portion 24 by 160 and 170 degrees. More preferably, the angle α is 170 degrees. Therefore, the upper body portion 22 is inclined relative to the lower body portion 24 by 170 degrees.

As shown, the upper body portion 22 is inclined inboard with respect to the lower body portion 24 to create a dome-like shape of the aerodynamic cover 18 to help capture the airflow beneath the vehicle body 17 to direct the captured airflow rearward. The inclination of the aerodynamic cover 18 also helps capture airflow on an inboard side S1 of the aerodynamic cover 18 to help move the airflow rearward. This arrangement and structure helps prevent the airflow from gathering beneath the truck bed 16 which creates more drag.

As shown, the aerodynamic cover 18 has the inboard side S1 that faces towards the vehicle's 10 center, and an outboard side S2 that faces towards the vehicle 10 exterior. In the illustrated embodiment, "outboard" refers to a side or direction facing the vehicle's 10 exterior. The upper body portion 22 has a first tapering edge 26A at a frontside and a second tapering edge 26B at a rear side of the aerodynamic cover 18. The first tapering edge 26A is positioned closer to the vehicle's 10 front than the second tapering edge 26B.

Figure 5:
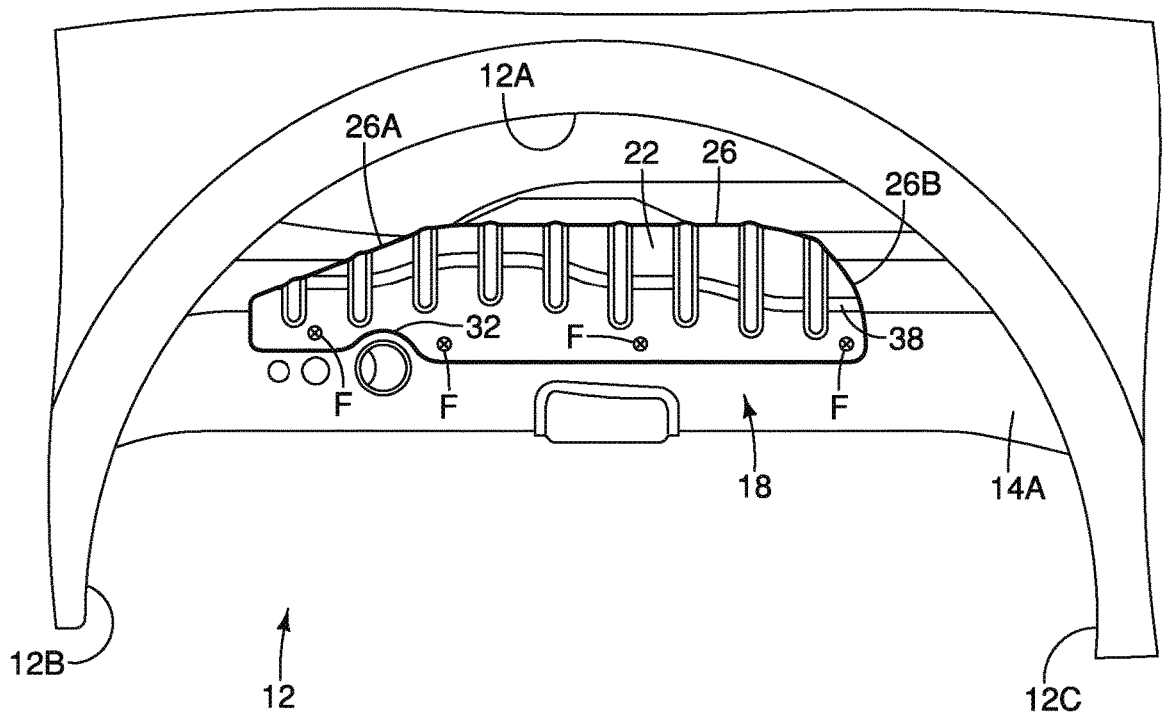
FIG. 5 is an elevational view of the wheel well area of FIG. 4 with the tire removed.
Figure 6:
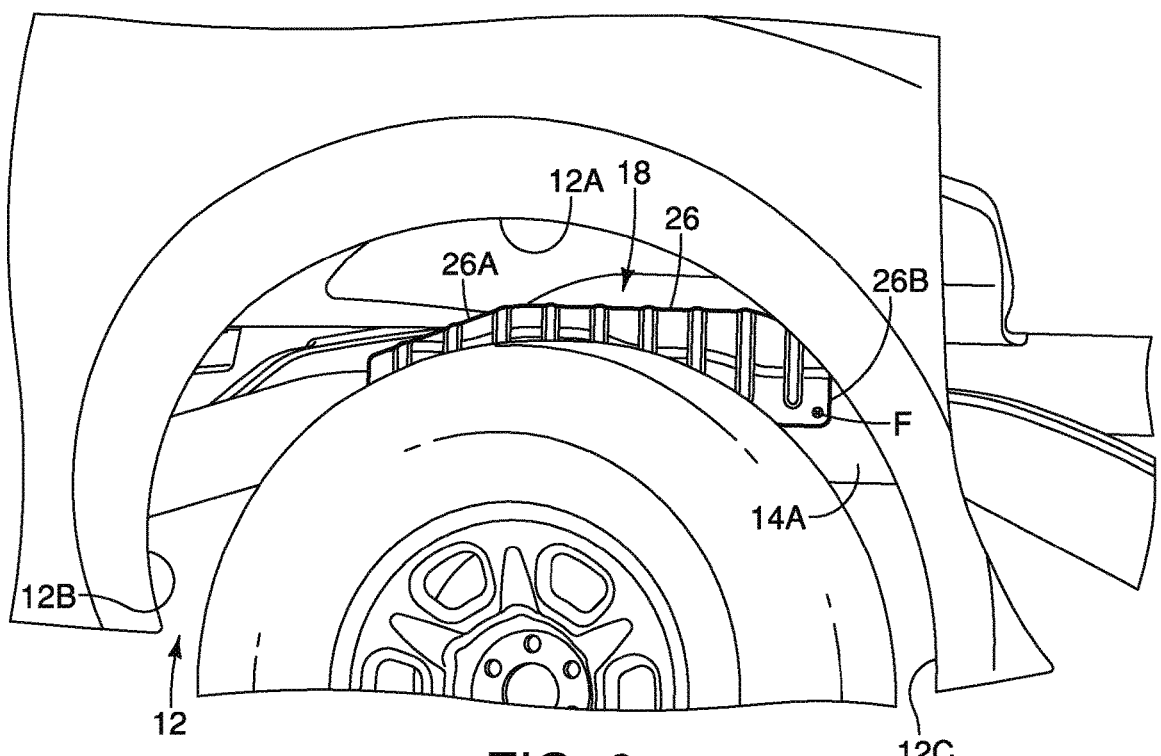
FIG. 6 is a front perspective view of the wheel well area of FIG. 4.
Figure 7:
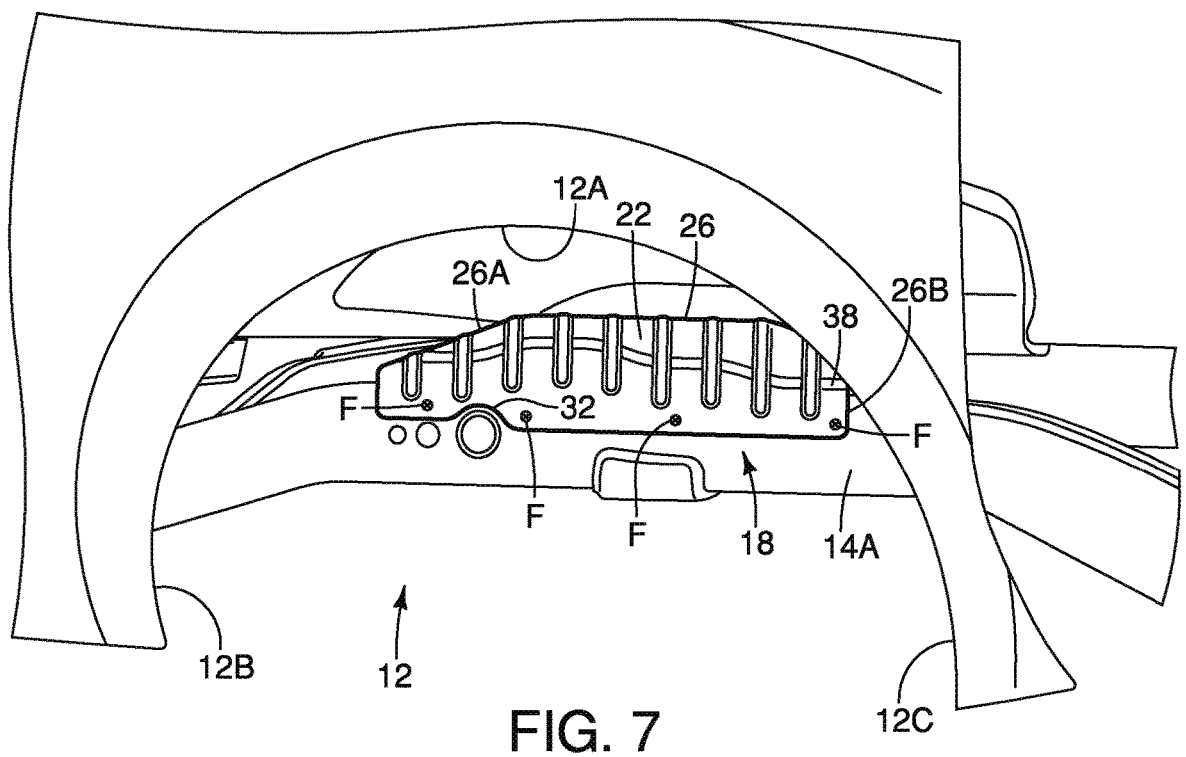
FIG. 7 is a front perspective view of the wheel well area of FIG. 6 with the tire removed.
Figure 8:
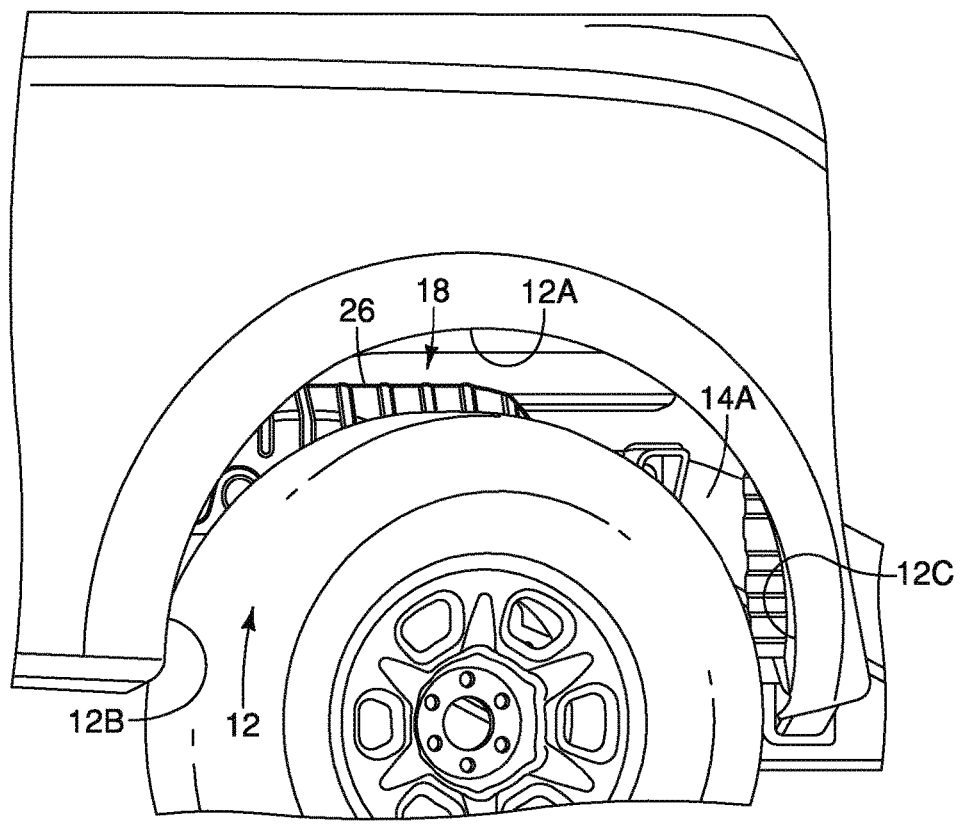
FIG. 8 is a rear perspective view of the wheel well area of FIG. 4.
Figure 13:
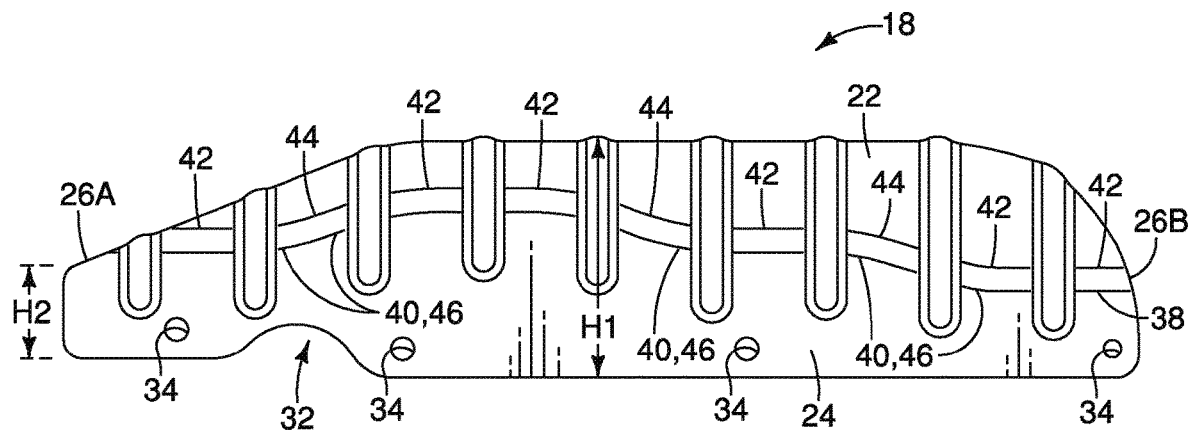
FIG. 13 is a elevational plan view of the aerodynamic cover as seen from the inboard side of the aerodynamic cover.
Figure 14:
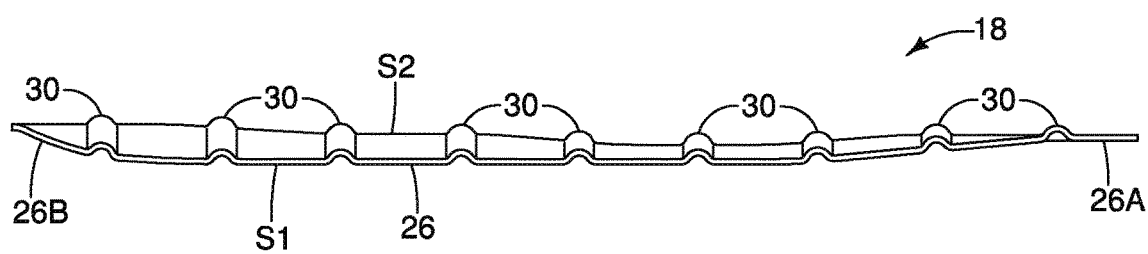
FIG. 14 is a top view of the aerodynamic cover.
Figure 15:
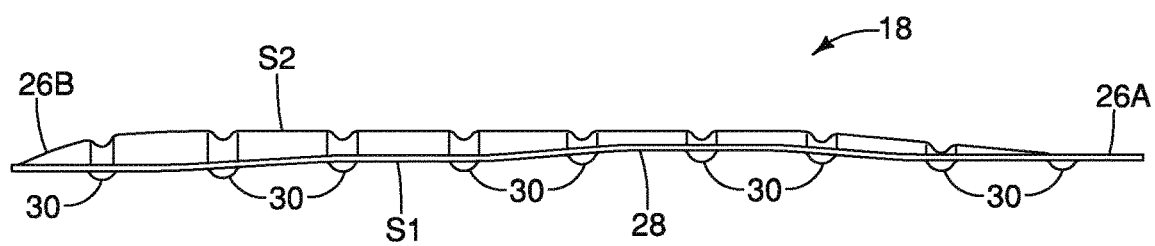
FIG. 15 is a bottom view of the aerodynamic cover.
Figure 16:
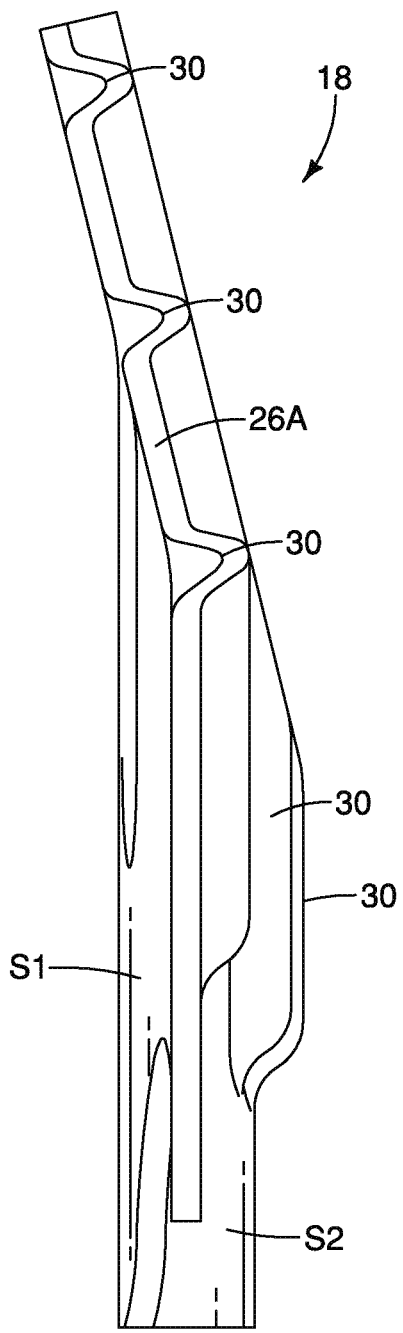
FIG. 16 is a side view of the aerodynamic cover as seen from a front side of the aerodynamic cover.

As shown in FIGS. 5 to 7, the first tapering edge 26A is steeper than the second tapering edge 26B so to help channel the airflow rearward. That is, the top edge 26 of the aerodynamic cover 18 inclines upward when going from the frontside to the rear side of the aerodynamic cover 18. The top edge 26 then flattens and tapers towards the second tapering edge 26B at the rear side. That is, aerodynamic cover 18 has a maximum height H1 which is the distance between the bottom edge 28 to the top edge 26, as seen in FIG. 13. The aerodynamic cover 18 has a minimum height H2 as defined by the bottom edge 28 and a leading point of the first tapering edge 26A, as seen in FIG. 13.

In the illustrated embodiment, the term "frontside" refers to a forward end area of the referenced component including the forward end of the component and the area and/or portion of the component directly adjacent within the vicinity of the forward end. In the illustrated embodiment, the term "rear side" refers to a rearward end area of the referenced component including the rearward end of the component and the area and/or portion of the component directly adjacent within the vicinity of the rearward end.

Figure 21:
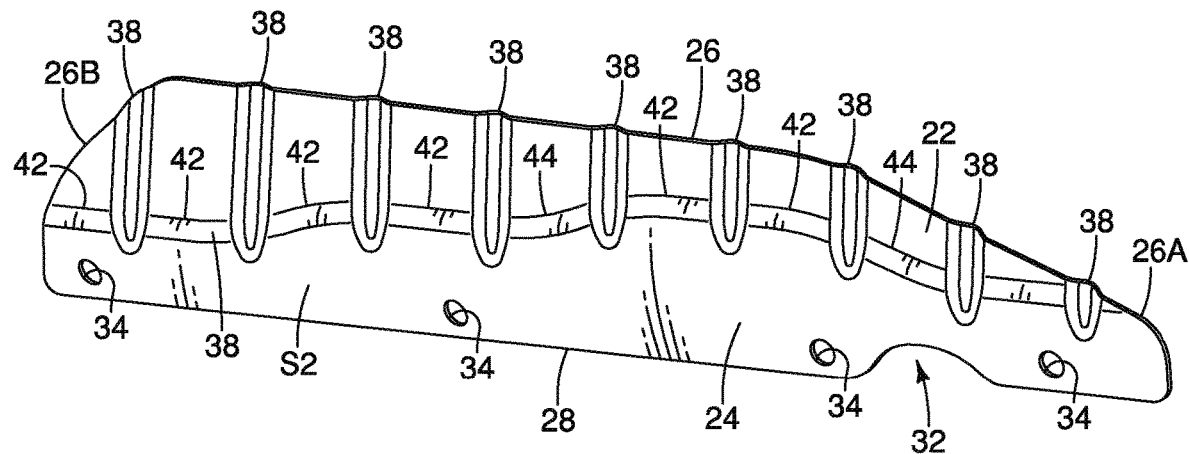
FIG. 21 is a perspective view of the aerodynamic cover having modified stiffening ribs.
Figure 22:
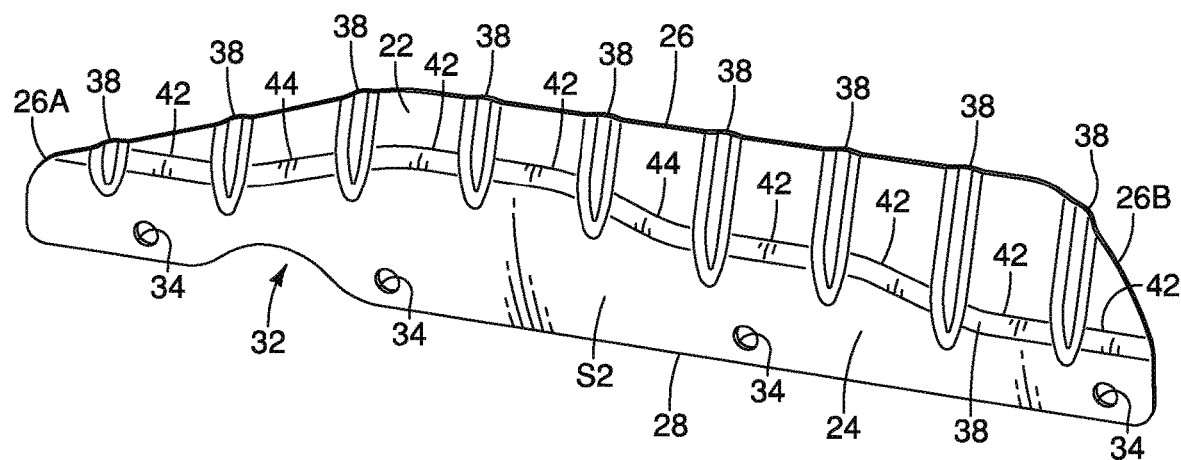
FIG. 22 is another perspective view of the aerodynamic cover having modified stiffening ribs.

As best seen in FIGS. 10 to 12, the upper body portion 22 has a plurality of stiffening ribs 30. The stiffening ribs 30 are disposed on the inboard side S1 of the upper body portion 22. That is, the stiffening ribs 30 project from the upper body portion 22 when the aerodynamic cover 18 is installed. While the stiffening ribs 30 of the aerodynamic cover 18 is shown as projecting in the outboard direction, it will be apparent to those skilled in the vehicle field from this disclosure that the outboard surface can be entirely smooth and flat to diminish air drag at the outboard side S2. Further, it will be apparent to those skilled in the vehicle field from this disclosure that the stiffening ribs 30 can project in the inboard direction such as shown in FIGS. 21 and 22. That is, the stiffening ribs 30 can protrude on the inboard side S1 of the aerodynamic cover 18 as shown in FIGS. 21 and 22.

Figure 9:
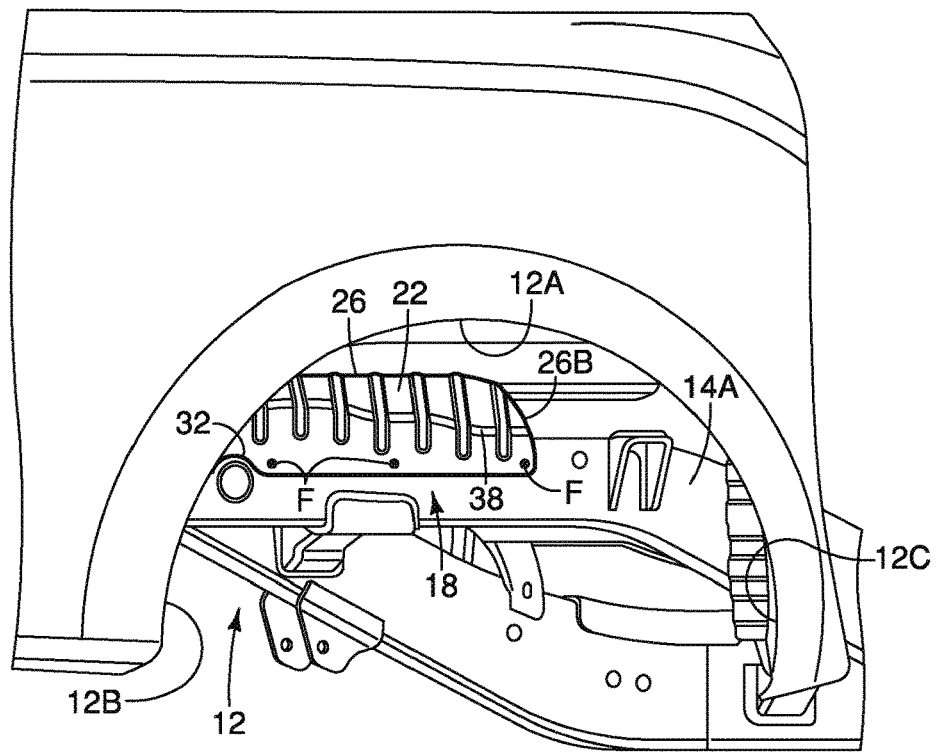
FIG. 9 is a rear perspective view of the wheel well area of FIG. 8 with the tire removed.

The aerodynamic cover 18 is mounted to the frame rail 14A at the lower body portion 24. As seen in FIGS. 7, 9 and 10, the aerodynamic cover 18 can include one or more clearance cut-outs 32. For example, the aerodynamic cover 18 includes a semi-circular cut-out 32 that is clearance for different structural components (e.g., a tube extending through the frame rail 14A) of the vehicle 10. It will be apparent to those skilled in the vehicle field from this disclosure that aerodynamic cover 18 can include additional clearance cut-outs of different sizes, shapes and locations on the aerodynamic cover 18 in order to accommodate the components of the vehicle 10 as needed. The clearance cut-out 32 can also serve to position the aerodynamic cover 18 at the correct location on the frame rail 14A during installation.

As seen in FIGS. 10 to 12, the lower body portion 24 has at least one opening 34 for receiving a fastener (e.g., a bolt 36, a screw, etc.) therethrough. As shown, the lower body portion 24 includes a plurality of openings 34 for receiving fasteners that will secure the aerodynamic cover 18 to the frame rail. In the illustrated embodiment, the aerodynamic cover 18 preferably includes four mounting points having the openings 34 to mount the aerodynamic cover 18 to the frame rail 14A at the mounting points. The openings 34 are spaced along the aerodynamic cover 18 to a degree to best prevent rattling of the aerodynamic cover 18 against the frame rail 14A.

In the illustrated embodiment, the openings 34 of the aerodynamic cover 18 preferably receive a respective self-tapping threaded bolt 36, as seen in FIGS. 5 and 7. Therefore, the fasteners are self-tapping threaded bolts 36 in the illustrated embodiment. Preferably, the self-tapping threaded bolts 36 are already tapped into the frame rail 14A. That is, the frame rail 14A is provided as having the self-tapping threaded bolts 36 such that a user can cut the four threaded openings 34 into the frame rail 14A to correspond with the openings 34 of the aerodynamic cover 18.

Referring to FIGS. 10, 13 and 18 to 20, the vehicle aerodynamic cover 18 further includes a boundary 38 connecting the bolts 36 upper and lower body portions 22 and 24. The boundary 38 defines an inflection point 40 of the aerodynamic cover 18 in which the upper body portion 22 inclines with respect to the lower body portion 24. The boundary 38 is separated by the top edge 26 by a changing distance. The boundary 38 is separated by the bottom edge 28 by another changing distance. That is, the upper body portion 22 is inclined with respect to the lower body portion 24 along a changing inflection point 40 in a longitudinal length direction of the aerodynamic cover 18.

Figure 17:
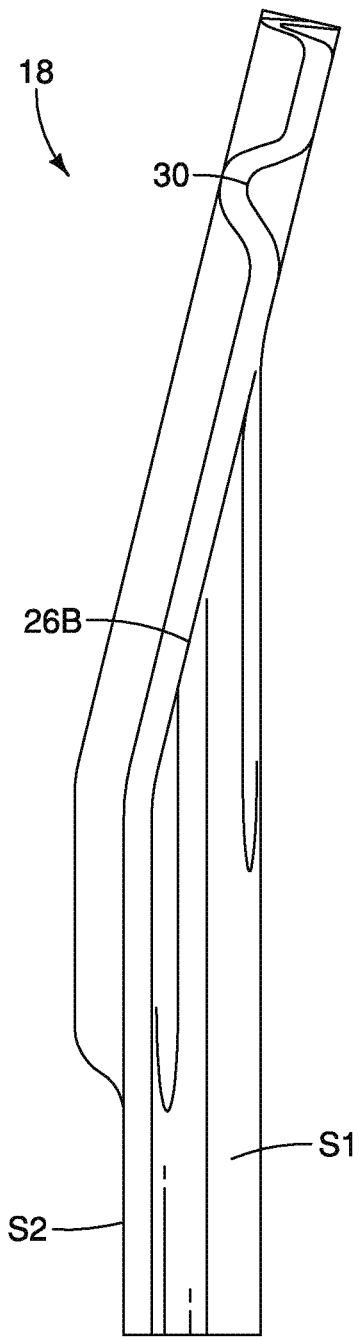
FIG. 17 is a side view of the aerodynamic cover as seen from a rear side of the aerodynamic cover.
Figure 20:
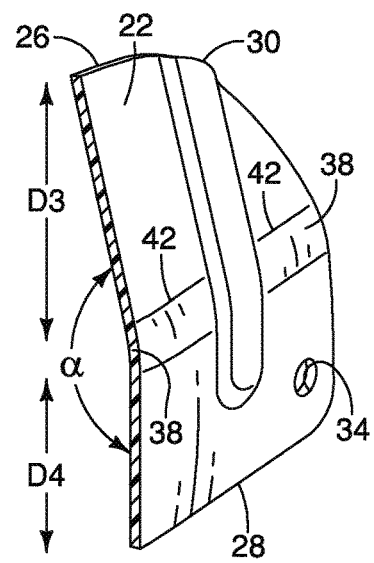
FIG. 20 is another perspective cross-sectional view of a portion of the aerodynamic cover.

For example, as seen in FIG. 19, the boundary 38 is separated by the top edge 26 by a first distance D1, and is separated by the top edge 26 by a second distance D2. As seen in FIG. 20, the boundary 38 is separated by the top edge 26 by a third distance D3, and is separated by the top edge 26 by a fourth distance D4. The first distance D1 is different from the third distance D3. The second distance D2 is different from the fourth distance D4. Therefore, the inflection point 40 in which the upper body portion 22 becomes inclined with respect to the lower body portion 24 of FIG. 21 is different from the inflection point 40 of FIG. 22. As best seen in FIGS. 13 and 17, the aerodynamic cover 18 of the illustrated embodiment includes a plurality of inflection points 40 with respect to the inclination of the upper body portion 22 to the lower body portion 24. The inflection points 40 are defined by the boundary 38.

Referring to FIGS. 10, 13 and 18 to 20, the boundary 38 includes a plurality of planar sections 42 and a plurality of inclined sections 44. Each of the plurality of planar sections 42 is separated by one of the inclined sections 44 of the plurality of inclined sections 44. The planar sections 42 are portions in which the boundary 38 does not change in distance between the bolts 36 upper and lower body portions 22 and 24. Therefore, the planar sections 42 lack inflection points 40 with respect to the inclination of the upper body portion 22 to the lower body portion 24. Preferably, each of the planar sections 42 are separated by a distance of 40 to 60 millimeters. The inclined sections 44 define the inflection points 40 of the boundary 38. The inclined sections 44 are preferably separated by a distance of 40 to 60 millimeters in the illustrated embodiment. That is, the inflection points 40 of the aerodynamic cover 18 are spaced by 40 to 60 millimeters along the longitudinal length of the aerodynamic cover 18.

The boundary 38 further includes a plurality of curved sections 46. Each of the plurality of curved sections 46 connects one of the planar sections 42 with one of the inclined sections 44. Therefore, each of the planar sections 42 curve into one of the inclined sections 44 which curves into another one of the planar sections 42, and so on. In the illustrated embodiment, the curved sections 46 include the inflection points 40 in which one of the planar sections 42 becomes an inclined section 44 or when an inclined section 44 becomes a planar section 42. The curved sections 46 help direct airflow across the planar sections 42 and the inclined sections 44 so that the airflow can flow from the front side to the rear side of the aerodynamic cover 18.

Referring to FIGS. 21 and 22, the aerodynamic cover 18 is illustrated as including stiffening ribs 38 that extend from the upper body portion 22 at the inboard side S1 of the aerodynamic cover. That is, the aerodynamic cover 18 can be provided with stiffening ribs 38 that do not protrude from the outboard side S2 but from the inboard side S1.

GENERAL INTERPRETATION OF TERMS

In understanding the scope of the present invention, the term "comprising" and its derivatives, as used herein, are intended to be open ended terms that specify the presence of the stated features, elements, components, groups and/or steps, but do not exclude the presence of other unstated features, elements, components, groups, and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle aerodynamic cover. Accordingly, these terms, as utilized to describe the present invention should be interpreted relative to a vehicle equipped with the vehicle aerodynamic cover.

The term "configured" as used herein to describe a component, section or part of a device that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle aerodynamic cover, comprising:
an upper body portion defining a top edge;
a lower body portion extending downwardly from the upper body portion and defining a bottom edge, the upper body portion being inclined in an inboard direction relative to the lower body portion when the aerodynamic cover is in an installed state; and
a boundary connecting the upper and lower body portions, the boundary includes a plurality of planar sections and a plurality of inclined sections, each of the plurality of planar sections being separated by one of the inclined sections of the plurality of inclined sections.

2. The vehicle aerodynamic cover according to claim 1, wherein
the boundary being separated by the top edge by a changing distance, the boundary being separated by the bottom edge by another changing distance.

3. The vehicle aerodynamic cover according to claim 1, wherein
the boundary includes a plurality of curved sections, each of the plurality of curved sections connecting one of the planar sections with one of the inclined sections.

4. The vehicle aerodynamic cover according to claim 1, wherein
the upper body portion is inclined relative to the lower body portion at an angle of 160 to 170 degrees.

5. The vehicle aerodynamic cover according to claim 4, wherein
the upper body portion is inclined relative to the lower body portion at a 170 degree angle.

6. The vehicle aerodynamic cover according to claim 2, wherein
each of the planar sections is separated from the next one of the planar sections by a distance of 40 to 60 millimeters.

7. The vehicle aerodynamic cover according to claim 2, wherein
the lower body portion is configured to be mounted to a vehicle frame rail, the lower body portion having at least one opening for receiving a fastener therethrough.

8. The vehicle aerodynamic cover according to claim 2, wherein
the upper body portion has a first tapering edge at a frontside and a second tapering edge at a rear side, the first tapering edge is steeper than the second tapering edge.

9. The vehicle aerodynamic cover according to claim 2, wherein
the upper body portion has a plurality of stiffening ribs disposed on an inboard facing surface of the upper body portion.

10. A vehicle comprising:
a chassis having a pair of frame rails;
a truck bed mounted on the chassis; and
a first vehicle aerodynamic cover supported to one of the pair of frame rails to cover a gap formed between the chassis and the truck bed, the first aerodynamic cover inclining inboard when supported to the one of the frame rails.

11. The vehicle according to claim 10, wherein
the first vehicle aerodynamic cover includes an upper body portion defining an top edge, a lower body portion extending downwardly from the upper body portion and defining a bottom edge, the upper body portion being inclined in an inboard direction relative to the lower body portion when the aerodynamic cover is supported to the one of the frame rails.

12. The vehicle according to claim 10, wherein
the first vehicle aerodynamic cover further includes a boundary connecting the upper and lower body portions, the boundary being separated by the top edge by a changing distance, the boundary being separated by the bottom edge by another changing distance.

13. The vehicle according to claim 12, wherein
the boundary includes a plurality of planar sections and a plurality of inclined sections, each of the plurality of planar sections being separated by one of the inclined sections of the plurality of inclined sections.

14. The vehicle according to claim 13, wherein
the boundary includes a plurality of curved sections, each of the plurality of curved sections connecting one of the planar sections with one of the inclined sections.

15. The vehicle according to claim 11, wherein
the upper body portion is inclined relative to the lower body portion at an angle of 10 to 20 degrees.

16. The vehicle according to claim 11, wherein
the upper body portion is inclined relative to the lower body portion at a 15 degree angle.

17. The vehicle according to claim 13, wherein
each of the planar sections are separated by a distance of 40 to 60 millimeters.

18. The vehicle according to claim 10, further comprising
a second vehicle aerodynamic cover supported to the other one of the pair of frame rails to cover a gap formed between the chassis and the truck bed, the second aerodynamic cover inclining inboard when supported to the other one of the frame rails.

* * * * *